United States Patent [19]
Lau et al.

[11] Patent Number: 6,047,346
[45] Date of Patent: Apr. 4, 2000

[54] SYSTEM FOR ADJUSTING SLEW RATE ON AN OUTPUT OF A DRIVE CIRCUIT BY ENABLING A PLURALITY OF PRE-DRIVERS AND A PLURALITY OF OUTPUT DRIVERS

[75] Inventors: Benedict C. Lau, San Jose; Jason Wei, Cupertino; Tsyr-Chyang Ho, San Jose; Samir A. Patel, Los Altos; Yiu-Fai Chan, Los Altos Hills, all of Calif.

[73] Assignee: Rambus Inc., Mountain View, Calif.

[21] Appl. No.: 09/017,529

[22] Filed: Feb. 2, 1998

[51] Int. Cl.[7] .................................................. G06F 13/14
[52] U.S. Cl. ........................ 710/126; 327/158; 327/170; 327/262; 361/18
[58] Field of Search ...................... 710/126, 8; 327/158, 327/170, 262, 374, 380; 361/18

[56] References Cited

U.S. PATENT DOCUMENTS

| | | | |
|---|---|---|---|
| 4,338,569 | 7/1982 | Petrich | 328/155 |
| 4,884,041 | 11/1989 | Walker | 331/57 |
| 5,180,994 | 1/1993 | Martin et al. | 331/38 |
| 5,223,755 | 6/1993 | Richley | 327/158 |
| 5,254,883 | 10/1993 | Horowitz et al. . | |
| 5,399,995 | 3/1995 | Kardontchik et al. | 331/17 |
| 5,451,894 | 9/1995 | Guo | 327/241 |
| 5,485,490 | 1/1996 | Leung et al. | 375/371 |
| 5,506,815 | 4/1996 | Hsieh et al. | 365/230.03 |
| 5,513,327 | 4/1996 | Farmwald et al. | 395/309 |
| 5,532,633 | 7/1996 | Kawai | 327/174 |
| 5,534,805 | 7/1996 | Miyazaki et al. | 327/144 |
| 5,537,070 | 7/1996 | Risinger | 327/170 |
| 5,550,783 | 8/1996 | Stephens, Jr. et al. | 365/233 |
| 5,554,945 | 9/1996 | Lee et al. | 327/105 |
| 5,568,081 | 10/1996 | Lui et al. | 327/380 |
| 5,570,054 | 10/1996 | Takla | 327/292 |
| 5,614,855 | 3/1997 | Lee et al. | 327/158 |
| 5,673,295 | 9/1997 | Read et al. | 375/356 |
| 5,712,883 | 1/1998 | Miller et al. | 375/371 |
| 5,712,884 | 1/1998 | Jeong | 375/375 |

(List continued on next page.)

OTHER PUBLICATIONS

Thomas H. Lee, et al., "A 2.5 V CMOS Delay–Locked Loop for an 18 Mbit, 500 Megabyte/s DRAM," IEEE Journal of Solid State Circuits, vol. 29, No. 12, Dec. 1994, 6 pgs.

Edmund A. Reese, et al., "FA 18.4: A Phase–Tolerant 3.8GB/s Data–Communication Router for a Multiprocessor Supercomputer Backplane," ISSC94/Session 18/High–Performance Logic And Circuit Techniques/Paper FA 18.4, 1994 IEEE, 4 pgs.

Satoru Tanoi, et al., "A 250–622 MHz Deskew and Jitter–Suppressed Clock Buffer Using Two–Loop Architecture," IEEE Journal of Solid State Circuits, vol. 31, No. 4, Apr. 1996, pp. 487–491.

Andre DeHon, "In–System Timing Extraction and Control through Scan–Based, Test–Access Ports," M.I.T. Transit Project, Transit Note #102, Jan. 1994, 19 pgs.

Atsushi Hatakeyama, et al. "A 256Mb SDRAM Using a Register–Controlled Digital DLL," ISSCC97/Session4/DRAM/Paper TP4.5, 1997 IEEE, 2 pgs.

Stefanos Sidiropoulos and Mark Horowitz, "A Semi–Digital DLL with Unlimited Phase Shift Capability and 0.08–400MHz Operating Range," ISSCC97/Session 20/Clocking and I/O/Paper SA 20.2, 1997 IEEE, 5 pgs.

PCT Search Report, Int'l application PCT/US98/02053, mailed Aug. 12, 1998, 5 pgs.

Lee, Thomas H., A. 2.5 V CMOS Delay–Locked Loop for an 18 Mbit, 500 Megabyte/s DRAM, IEEE Journal, vol. 29, No. 12, Dec. 1994.

*Primary Examiner*—Thomas C. Lee
*Assistant Examiner*—Abdelmoniem Elamin
*Attorney, Agent, or Firm*—Blakely, Sokoloff, Taylor & Zafman LLP

[57] ABSTRACT

An interface circuit providing a high speed bus. According to one embodiment, the interface circuitry includes a plurality of I/O pins coupled to a plurality of bus drivers, wherein each bus driver is configured to adjust the rise time, fall time, and drive strength of outputs signal on the I/O pins based on process-voltage-temperature ("PVT") conditions. The circuitry used to adjust the I/O outputs includes a slew rate control circuit, a current control circuit, and a delay lock loop ("DLL").

24 Claims, 10 Drawing Sheets

U.S. PATENT DOCUMENTS

| | | | |
|---|---|---|---|
| 5,744,991 | 4/1998 | Jefferson et al. | 327/158 |
| 5,745,792 | 4/1998 | Jost | 295/878 |
| 5,764,092 | 6/1998 | Wada et al. | 327/271 |
| 5,774,315 | 6/1998 | Mussenden | 361/18 |
| 5,799,051 | 8/1998 | Leung et al. | 375/376 |
| 5,801,985 | 9/1998 | Roohparvar et al. | 365/185.01 |
| 5,841,296 | 11/1998 | Churcher et al. | 326/49 |
| 5,887,150 | 3/1999 | Schneider et al. | 710/126 |
| 5,890,014 | 3/1999 | Long | 395/828 |

SYSTEM FOR ADJUSTING SLEW RATE ON AN OUTPUT OF A DRIVE CIRCUIT BY ENABLING A PLURALITY OF PRE-DRIVERS AND A PLURALITY OF OUTPUT DRIVERS

CROSS-REFERENCE TO RELATED APPLICATIONS

This application is related to U.S. Pat. No. 5,959,481, entitled "BUS DRIVER CIRCUIT INCLUDING A SLEW RATE INDICATOR CIRCUIT HAVING A ONE SHOT CIRCUIT SERIES OF DELAY ELEMENTS." This application is also related to the U.S. patent application Ser. No. 08/897,658, entitled "A METHOD AND APPARATUS OF SYNCHRONIZING A CONTROL SIGNAL" and the U.S. patent application Ser. No. 08/795,657, filed on Feb. 6, 1997 (still pending) entitled "DELAY LOCKED LOOP CIRCUITRY FOR CLOCK DELAY ADJUSTMENT." Each of the above referenced applications is assigned to the assignee of this application.

The following is a discussion of the related applications. Both the BUS DRIVER CIRCUIT INCLUDING A SLEW RATE INDICATOR CIRCUIT HAVING A SERIES OF DELAY ELEMENTS application and the BUS DRIVER CIRCUIT INCLUDING A SLEW RATE INDICATOR CIRCUIT HAVING A ONE SHOT CIRCUIT SERIES OF DELAY ELEMENTS application describe varying the drive strength of a preliminary driver to affect the slew rate of a final bus driver. In particular, both applications describe dynamically adding or removing parallel devices to a preliminary driver based on current operating conditions affecting the timing output of a bus driver.

The CURRENT CONTROL TECHNIQUE application describes sampling the voltage levels on an output pad and comparing the sampled voltage levels to a reference voltage. Based on the comparison of voltage levels to the reference voltage, the application describes incrementing or decrementing the current source on the output pad.

The DELAY LOCKED LOOP CIRCUITRY FOR CLOCK DELAY ADJUSTMENT application describes generating a predetermined phase relationship between a pair of clocks. The generated clocks are used in memory elements to synchronize data transmission.

FIELD OF THE INVENTION

The present invention relates to an interface circuitry between two components. More particularly, the present invention relates to interface circuitry used to increase the transmission rates between a controller circuit and a slave device such as a memory element.

BACKGROUND

Improvements in microprocessor designs have led to microprocessors with a high operating frequency. Current microprocessor designs exceed operating frequencies of 200 megahertz ("MHz"). However, the increase in operating frequency has not led to fully acceptable performance gains. One of the main components affecting performance gains is created by the microprocessor execution units idling during delays in external memory access. The delays in external memory access are caused by the conventional design characteristics of static random access memory ("SRAM") cells, read only memory ("ROM") cells, and dynamic random access memory ("DRAM") cells.

Figure 1:
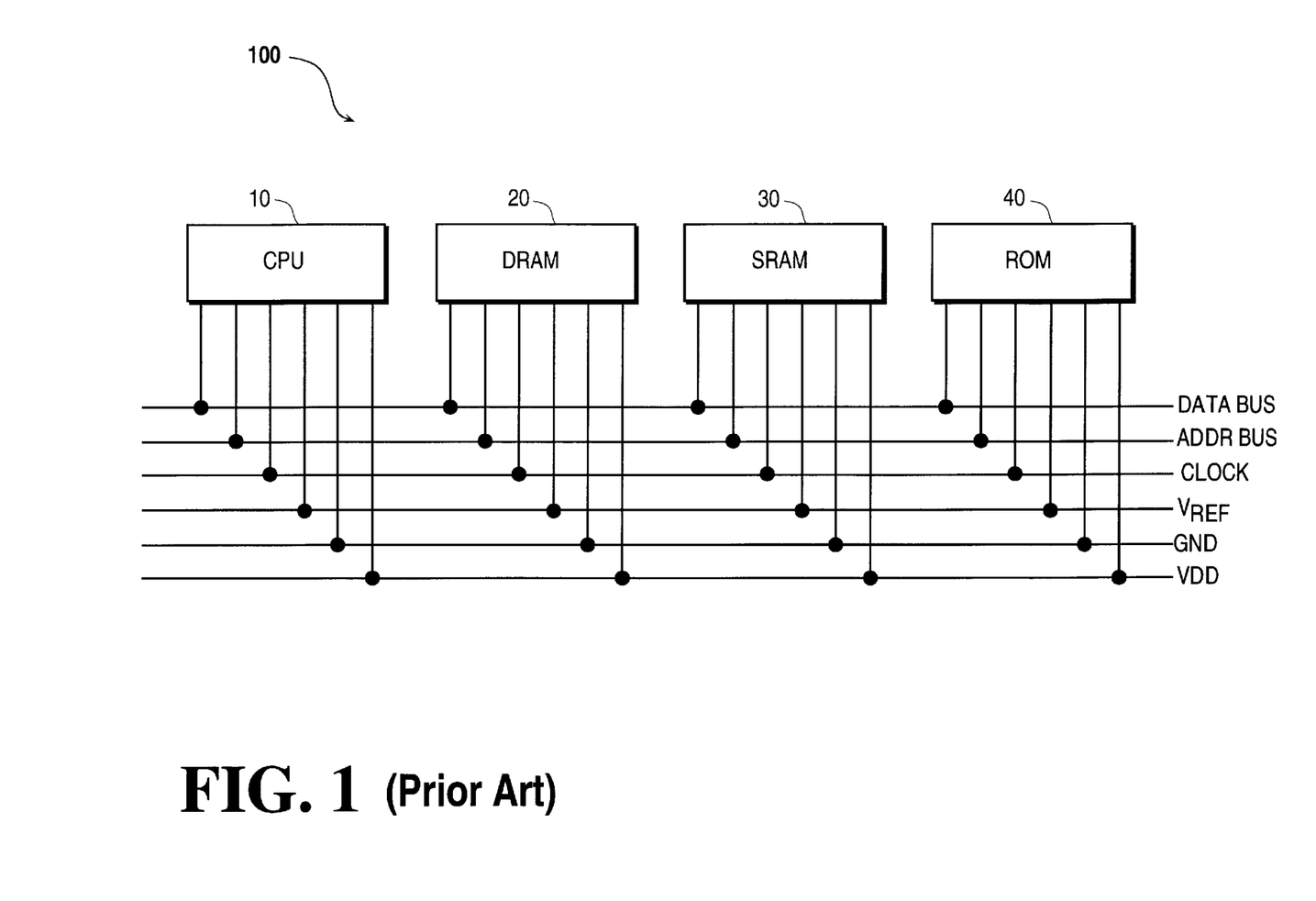
FIG. 1 illustrates a prior art bussing scheme.

To counteract the performance losses associated with external memory access, Rambus Inc., of Mountain View, Calif. developed a high speed multiplexed bus. FIG. 1 illustrates the Rambus high speed bus. In particular, system 100 shows a master device, central processing unit ("CPU") 10, coupled to slave devices DRAM 20, SRAM 30, and ROM 40. Each device is coupled in parallel to signal lines DATA BUS, ADDR BUS, CLOCK, $V_{REF}$, GND, and VDD. DATA BUS and ADDR BUS show the data and address lines used by CPU 10 to access data from the slave devices. CLOCK, $V_{REF}$, GND, and VDD are the clock, voltage reference, ground, and power signals shared between the multiple devices. Data is transferred by a single device's bus drivers (not shown) driving signals on the bus. The signals are transmitted across the bus to a destination device.

To increase the speed of external memory accesses system 100 supports large data block transfers between the input/output ("I/O") pins of CPU 10 and a slave device. System 100 also includes design requirements that constrain the length of the transmission bus, the pitch between the bus lines, and the capacitive loading on the bus lines. Using these design requirements system 100 operates at a higher data transfer rate than conventional systems. Accordingly, by increasing the data transfer rate, system 100 reduces the idle time in CPU 10.

System 100, however, does not provide enough bus bandwidth for developing technologies. New technologies require data transfer rates greater than 500 megabits per second ("Mb/s") per pin. Alternatively, new technologies require operation speeds of at least several hundred MHz. Operating at high frequencies accentuates the impact of process-voltage-temperature ("PVT") on signal timings and signal levels. The PVT variances result in numerous disadvantages that create high transmission errors (i.e. data loss) when operating system 100 at a 400 MHz frequency, for example.

One disadvantage of operating system 100 at a speed such as 400 MHz is that system 100 may not provide a desired slew rate at high operating speeds. In particular, the constraints on loading, bus length, and bus pitch in conjunction with block data transfer do not provide for a stable slew rate at 400 MHz. Slew rate describes the rate at which a bus driver switches the voltage on a bus line. Slew rate of the bus driver is an extremely important characteristic for ensuring proper operation at high frequencies.

Another disadvantage of operating system 100 at 400 MHz is that system 100 incurs ringing in the power lines VDD and GND, resulting in signal distortion. Thus, the inductive/capacitive characteristics of the bus and signal lines are exaggerated at a higher frequency resulting in signal distortion. Yet another disadvantage of operating system 100 at 400 MHz is that system 100 cannot provide low error rates. In particular, at high operating frequencies, the simple clocking scheme of system 100 does not guarantee synchronization between transmitted data and the clocking scheme in the destination device. Thus, incorrect data can be captured in a destination device.

SUMMARY OF THE INVENTION

Therefore, it is an object of the present invention to provide interface circuitry resulting in a high speed bus.

These and other objects are met by an interface circuit configured to provide a high speed data transfer rate. The interface circuit includes a plurality of outputs, wherein each output is coupled to a drive circuit. The interface circuit also includes a first circuit coupled to at least one output and to a first set of drive circuits. The first circuit controls current flow on the outputs. The interface circuit also includes a second circuit coupled to a second set of drive circuits. The second circuit controls slew rate on the outputs. The first and second circuit allow the interface circuit to provide a high speed bus despite changing process-voltage-temperature ("PVT") conditions.

Other objects, features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A multipurpose chip-to-chip interface circuit including a high speed transmission circuitry is disclosed. The interface circuit includes a number of I/O pins, high speed bus drivers, and timing circuitry. Placing the interface circuit in two devices coupled to a transmission channel provides for a high speed communication channel. For one embodiment, the high speed bus drivers couple to slew control circuitry, current control circuitry, and delay lock loop ("DLL") circuitry. Both the slew control circuit and the current control circuit provide variable drive strengths to accommodate for changes in process-voltage-temperature ("PVT") conditions. The DLL synchronizes data and clock transmission via a quadrature clock alignment between a receive and transmit clock. Thus, using the slew control circuitry, the current control circuitry, and the DLL circuitry, the high speed bus driver circuitry provides high bandwidth transmission in both ideal and non-ideal operating conditions. In one embodiment, each interface includes twenty-six I/O pins, each I/O pin transferring data at 800 Mb/s and operating on an 800 millivolt ("mv") logic swing. Accordingly, the transmission rate for devices using the interface is 2.6 giga bytes per second ("GB/s").

An intended advantage of an embodiment of the invention is to provide high speed bus communication between two devices. For one embodiment, the high speed communication is between a controller and a slave device, such as a memory element. Accordingly, the high speed communication reduces delays during processor access of external memory, thus increasing the processor's performance.

Another intended advantage of an embodiment of the invention is to reduce error rates in high speed communication busses. In particular, the slew control circuit and the current control circuit reduce ringing on power lines and ensure a consistent rise and fall time for data signals, thus reducing data distortion which in turn reduces error rates.

Yet another intended advantage of an embodiment of the invention is to provide an interface circuitry for multiple devices coupled to a bus. The interface circuit is included in at least two devices coupled to the bus. For one embodiment, the devices coupled to the bus include memory devices and controllers. Accordingly, the interface circuit increases communication speeds between memory devices, between controllers, or between a memory device and a controller.

Figure 2:
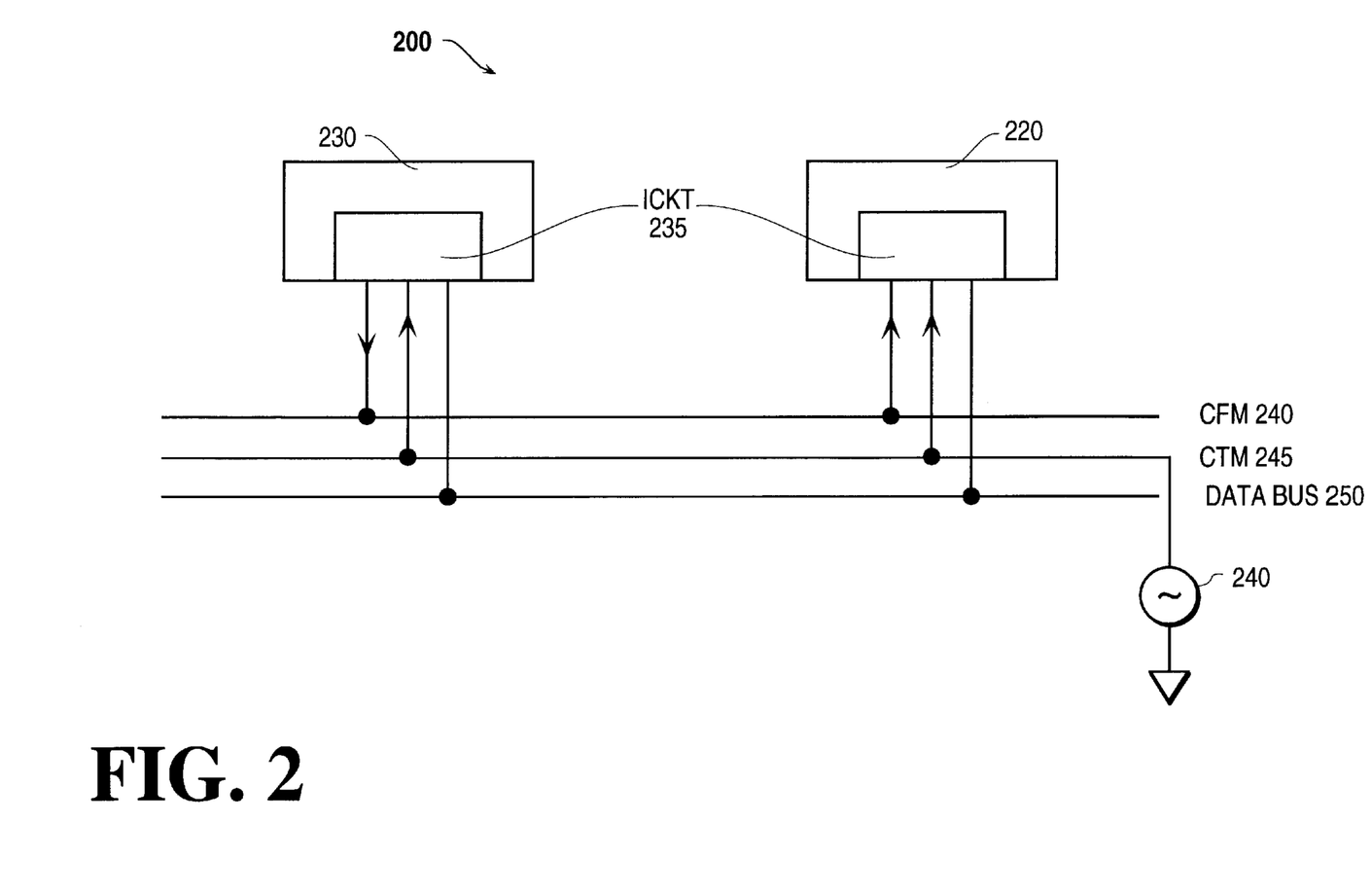
FIG. 2 shows one embodiment of interface circuitry included in two devices coupled to a high speed bus.

FIG. 2 shows a high speed bus using an interface circuit according to one embodiment. In particular, system 200 includes device 230 coupled to device 220 via DATA BUS 250, CFM 240, and CTM 245. As illustrated, both device 230 and device 220 include interface circuitry ("ICKT") 235. For one embodiment, DATA BUS 250 includes a twenty-six bit bidirectional bus used to transmit serial data between device 230 and 220. Accordingly, ICKT 235 converts parallel data to serial data prior to transmitting along DATA BUS 250. For an alternative embodiment, ICKT 235's outputs are divided between multiple devices.

Synchronization of data transmission between device 230 and device 220 is maintained by a DLL (not shown) included in ICKT 235. For one embodiment, device 230 is a master device which loops back the timing signal CFM 240 from CTM 240. CFM 240 is the same timing signal CTM 245 generated by oscillator 240 of system 200. CFM 240 is, however, looped back from the master device. As described below in connection with FIG. 10, timing signals CFM 240 and CTM 245 are used by ICKT 235 to generate a receive clock and a transmit clock. Both clocks are used to synchronize data transmission along DATA BUS 250.

Figure 3:
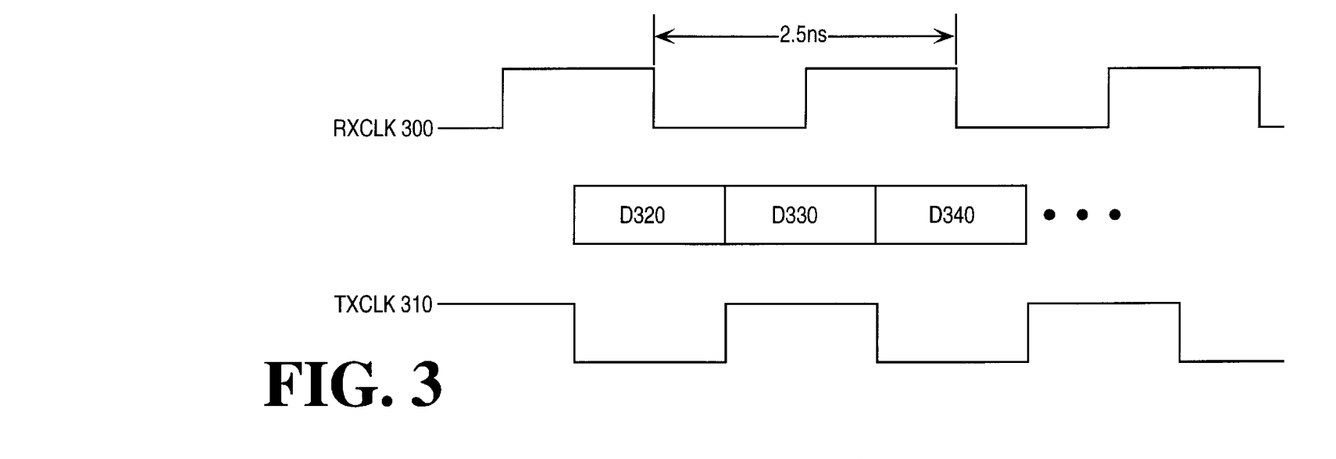
FIG. 3 is a timing diagram that illustrates the relation between transmitted data and a receiving clock.

FIG. 3 is a timing diagram that illustrates the relationship between transmitted data and a receiving clock. In particular, receive clock, RXCLK 300, and transmit clock, TXCLK 310, are generated from CFM 240 and CTM 245. For one embodiment, both RXCLK 300 and TXCLK 310 have a period of 2.5 nanoseconds ("ns"). In FIG. 3, data is transmitted along DATA BUS 250 in every phase of transmit clock TXCLK 310. D320, D330, and D340 describe the data values transmitted along DATA BUS 250. For example, D320 is transmitted in the first phase of TXCLK 310. Similarly, D330 is transmitted in a subsequent phase of TXCLK 310 and D340 is transmitted in the following phase of TXCLK 310. Thus, for one embodiment data is transferred at a rate of 800 MHz.

As discussed below, the DLL included in ICKT 320 maintains a quadrature clock alignment between TXCLK 310 and RXCLK 300. For one embodiment, the quadrature clock alignment ensures that TXCLK 310 is a ninety degree phase earlier than RXCLK 300. The earlier TXCLK 310 is used to ensure that capturing clock transition of receive clock RXCLK 300 occurs when a valid data is available on DATA BUS 250.

Figure 4:
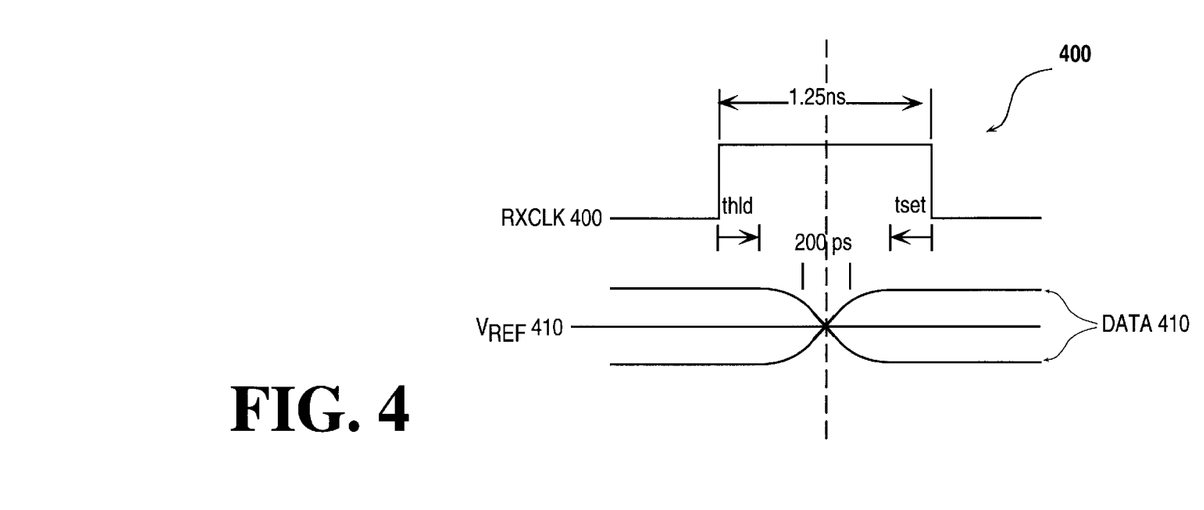
FIG. 4 shows one embodiment of data transition during a clocking period.

FIG. 4 shows one embodiment of data transition during a clocking period. In particular, timing diagram 400 includes RXCLK 400, a half period of RXCLK 300. Additionally, FIG. 4 shows the transition point of data 410. Data 410 transitions from either a high to low voltage or a low to high voltage level symmetrically around reference voltage, $V_{REF}$ 410. Data 410 transitions at the midpoint of RXCLK 400. Accordingly, a stable data value is reached prior to the capturing clock transition of RXCLK 400.

For one embodiment, $V_{REF}$ 410 is 1.4 volts, the high voltage ("Voh") equals 1.0 volt, the low voltage ("Vol")

equals 1.8 volts, and the transition from Voh to Vol takes approximately 200 picoseconds ("ps"). Accordingly, a data voltage transition of 800 mv represents a logic transition. As further illustrated in FIG. 4, the transition of data 410 is constrained to occur after a set time period, thld, from a clock edge of RXCLK 400. Similarly, the transition of data 410 is constrained to occur before a set time period, tset, prior to a clock edge of RXCLK 400. The DLL, slew control circuit, and current control circuit included in ICKT 320 ensure that hold times, thld, and set up times, tset, are maintained for every data transition. For one embodiment, both thld and tset equal 425 ps.

Figure 5:
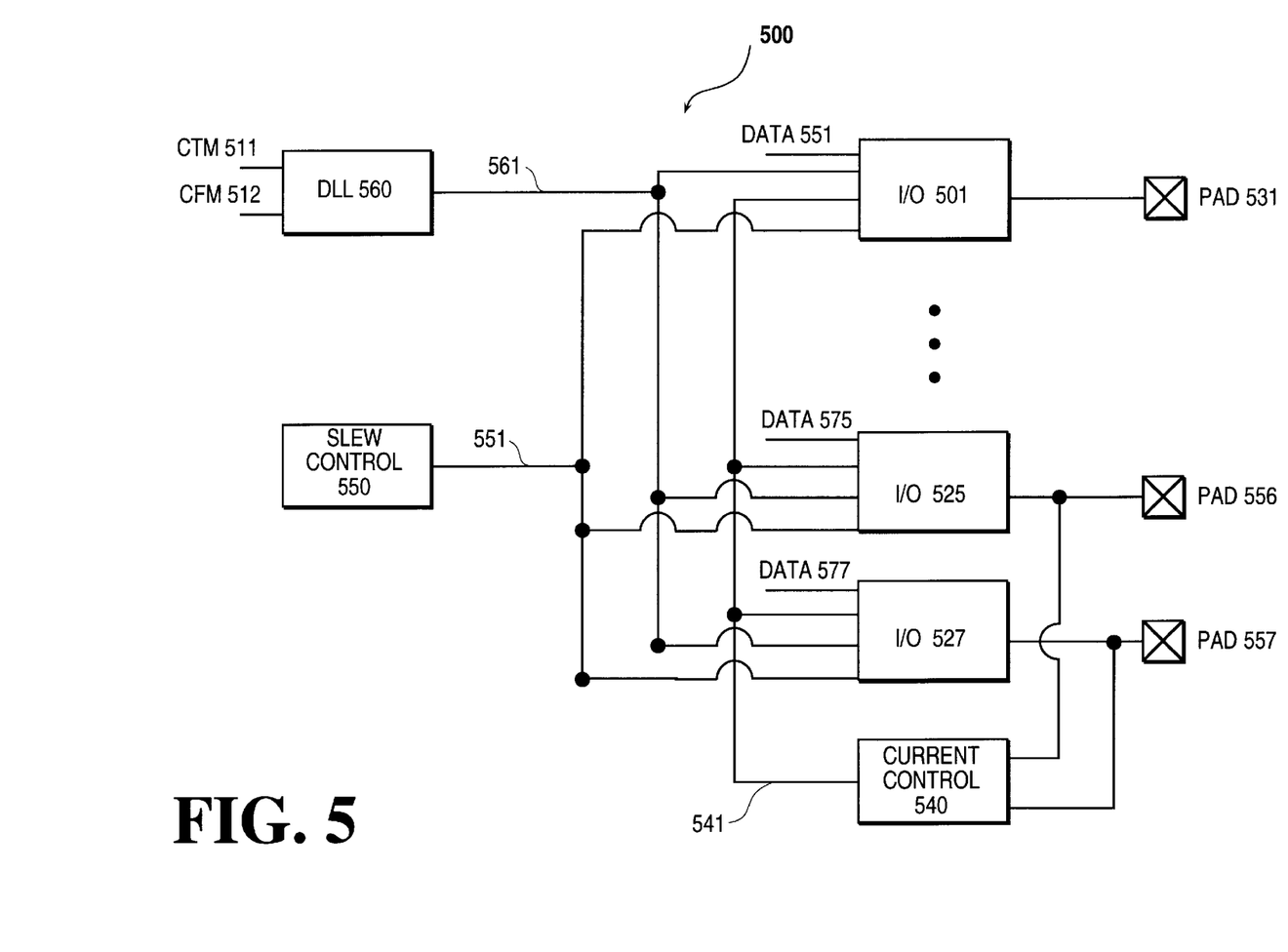
FIG. 5 shows one embodiment of an interface circuit.

FIG. 5 shows one embodiment of an ICKT. In particular, ICKT 500 illustrates the transmit circuitry used to drive data on an output pad. In ICKT 500, pads 531–557 and data 551–577 are coupled to blocks I/O 501–527, respectively. Each I/O block includes drive circuitry used by ICKT 500 to output data on a pad. For one embodiment, each data line in data 551–577 couples to an eight bit parallel bus. Accordingly, each I/O block 501–527 couples to an 8 to 1 multiplexing device (not shown) to select an input for the I/O block.

For one embodiment, each block I/O 501–527 includes a high speed bus driver (not shown). Accordingly, DLL 560, slew control 550, and current control 540, are coupled to each I/O block to ensure high transmission speeds despite varying PVT conditions. For alternative embodiments, multiple slew and current control circuits are used in an interface circuit, each pair of slew and current control circuit controlling a group of I/O blocks.

Slew control 550 is coupled to I/O blocks 510–527 via line 551. For one embodiment, line 551 includes four bit lines of control signals that enable pre-drivers in each I/0 device. Accordingly, by varying the values on line 561, slew control 550 enables/disables pre-drivers in each I/O block, thus affecting the slew rate on pads 531–577. Slew control 550 is further described in FIG. 7.

For one embodiment, current control 540 is coupled to pad 556 and pad 557. Current control 540 includes a feedback loop that uses the voltages on pad 556 and pad 557 to determine the necessary drive strength for 1/0 501–527. In particular, based on the voltage values of pad 556 and pad 557, current control 540 enables/disables pre-drivers in each I/O block via control signals on line 541. For one embodiment, line 541 includes seven bit lines of control signals that enable pre-drivers in each I/0 device. Current control 540 is further described in FIG. 9. For an alternative embodiment, current control 540 is coupled to a different number of pads.

DLL 560 is coupled to inputs CTM 511 and CFM 512. According to the present embodiment, CTM 511 and CFM 512 are differential signals. DLL 560 provides an output line 561. Line 561 is coupled to I/0 blocks 501–527. For one embodiment, line 561 includes two control signals RXCLK 300 and TXCLK 310. Accordingly, using RXCLK 300 and TXCLK 310, DLL 560 ensures that data transmitted on pads 531–577 transitions in the midpoint of RXCLK 300 when received, thus following timing diagram 400. DLL 546 is further described in FIG. 10.

Figure 6:
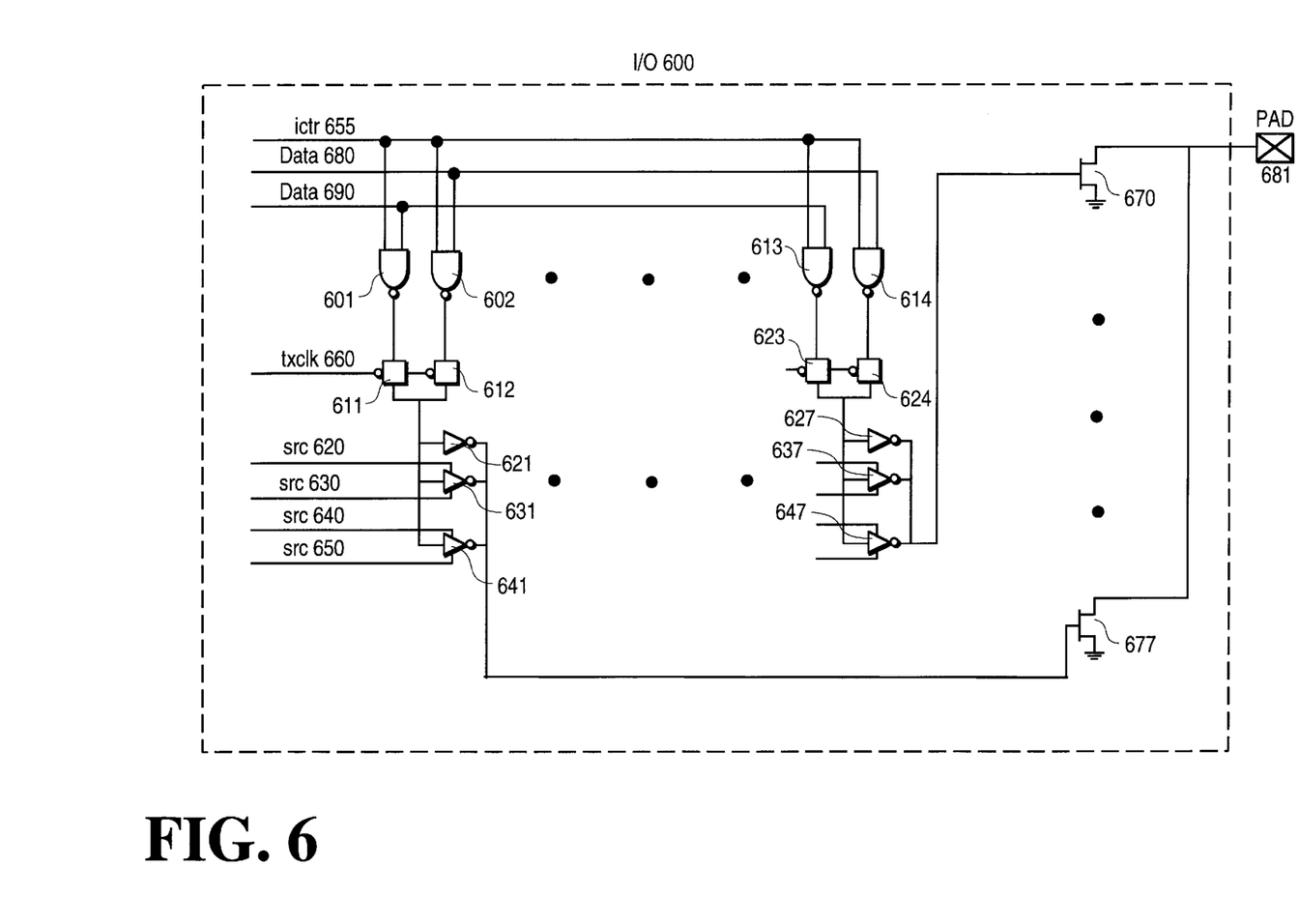
FIG. 6 shows one embodiment of a bus driver included in an I/O block.

FIG. 6 shows one embodiment of a high speed bus driver included in an I/O block. In particular, I/O 600 is used to receive and output data on pad 681. FIG. 6, however, only shows the bus driver circuit used to output data on pad 681. I/O 600 includes current control inputs (ictr 655), data inputs (data line 680 and data line 690), transmit clock signal (txclk 660), and slew rate control inputs (src 620–650). As illustrated in FIG. 6, the inputs ictr 655, data line 680, and data line 690 are coupled to NAND gates 601–614. The output of the NAND gates are coupled to muxes 611–624. Selection of the mux inputs is controlled by transmit clock txclk 660. Accordingly, for every clock phase the muxes select from a data value (data line 680 or data line 690) or a "1" value dependent on the values on input ictr 655. The outputs of the muxes are coupled to pre-drivers 621–627, 631–637, and 641–647. The pre-drivers in turn are used to enable output transistors NMOS 670–677. Accordingly, by varying the number of pre-drivers and output drivers I/O 600 controls the slew rate and drive strength on output pad 681. For one embodiment, the output transistor include CMOS technology. For an alternative embodiment, the output transistor include bi-polar technology. For yet another embodiment, the total number of pre-drivers, current control signals, and slew rate control signals is increased, thus providing finer control over slew rate and drive strength during varying PVT conditions. In yet another embodiment, the device sizes of the pre-drivers and output transistors is varied, thus providing finer control over slew rate and drive strength during varying PVT conditions.

For one embodiment, ictr 655 is a seven bit bus and each bit in ictr 655 enables a pair of NAND gates. For example, for one embodiment, the first bit in ictr 655 is set active, thus enabling NAND gates 601 and 602. The remaining NAND gates output a "1" value. Because only NAND gates 601 and 602 are enabled only pre-drivers 621, 631, and 641 output the values on input data line 680 or data line 690. Accordingly, when the transmit clock, txclk 660, selects between data line 680 and data line 690 only NMOS transistor 677 is used to drive pad 681. Thus, varying the value on input ictr 655 controls the current source used to drive pad 681 because ictr 655 varies the number of transistors NMOS 670–677 used in I/O 600. For one embodiment, the output of current control 540 generates ictr 655.

Provided ictr 655 enables a set of NAND gates and NMOS transistors, inputs src 620–650 determine the number of pre-drivers used to drive the gates of the selected NMOS transistor. Following the previous example, ictr 655 selects NAND 601, NAND 602, and NMOS transistor 677. Accordingly, src 620–650 determine whether pre-drivers 631 and/or 641 are used to drive the gate of NMOS transistor 677. For example, setting all inputs src 620–650 inactive results in a slow charge/discharge of the gate voltage on NMOS transistor 677 because only pre-driver 621 is used, thus resulting in a slow slew rate at pad 681. Alternatively, setting all inputs src 620–650 active results in a faster charge/discharge of the gate voltage on NMOS transistor 677, thus resulting in a fast slew rate at pad 681. Accordingly, varying the data on inputs src 620–650 controls the slew rate on pad 68. For one embodiment, the output of slew control 550 generates src 620–650.

For one embodiment, the inputs of I/O 600, ictr 655, and src 620–650, are controlled by current control circuits and slew control circuits, respectively. Accordingly, using I/0 600 in interface circuitry provides a high speed communication channel between devices using the interface circuitry. In particular, varying PVT conditions affect data transmission. The current and slew control circuits, however, cause I/O 600 to adjust the interface circuitry outputs, thus negating the effects of PVT variance on data transmission.

Figure 7:
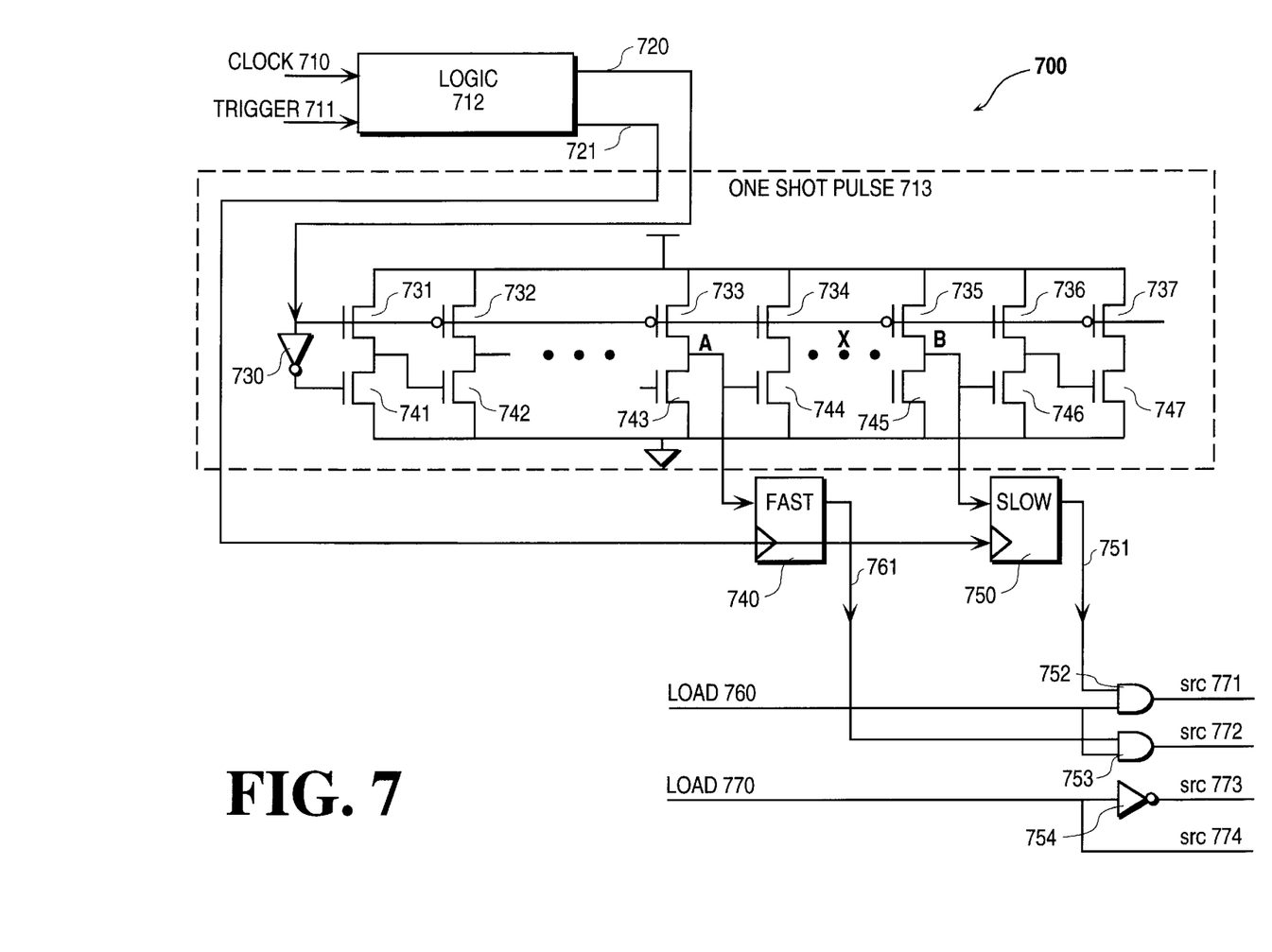
FIG. 7 shows one embodiment of a slew control circuit.

FIG. 7 shows one embodiment of a slew control circuit. Slew control circuit 700 includes logic 712, one shot 713, latches (740 and 750), and combinational logic (752, 753, and 754). Using inputs clock 710 and trigger 711, slew control circuit generates slew rate control signals, src 771 and 772, based on PVT conditions. In particular, based on PVT conditions the propagation delay through one shot 713 varies. Accordingly, the value captured by latches 740 and 750 varies. The captured values are used by the combinational logic to generate the slew rate control signals, thus resulting in slew rate control signals that follow PVT conditions. For one embodiment, the slew rate control signals are used to control the bus driver circuitry included in I/O 600, thus generating high speed outputs despite varying PVT conditions.

Logic 712 has inputs clock 710 and trigger 711. Clock 710 is derived from CTM 245. Trigger 711 is a calibration signal that initiates the generation of a signal propagated through one shot 713. For one embodiment, clock 710 has a period that is a one fourth division of CTM 245. In another embodiment, trigger 711 is calibration signal that is generate during the reset of an interface circuit. For yet another embodiment, trigger 711 is generated periodically, provided ICKT 500 is not transmitting data. Accordingly, slew control circuit 700 can continuously track environmental changes in the interface circuit without affecting data transmission.

As illustrated, logic 712 generates outputs 720 and 721. According to the present embodiment, the outputs are generated via a synchronous counter or a control circuit (not shown) that operates in response to trigger 711. This allows the generation and pulse width of outputs 720 and 721 to be accurately controlled. For one embodiment, output 720 is the FIRE signal illustrated in FIG. 8 and output 721 is the SAMP1 signal, also illustrated in FIG. 8.

The rising edge of the FIRE signal is propagated through one shot 713 via output 720 and inverter 730. For one embodiment, one shot 713 is a domino logic circuit including NMOS and PMOS transistors used in the bus driver circuitry. Because one shot 713 is manufactured using the same process as the bus driver circuitry and because one shot 713 is operating in the same environment as the bus driver circuitry, the propagation delay through one shot 713 substantially tracks the slew rate of the interface circuit's output signals. In particular, PVT variations that effect the slew rate on the outputs of the interface circuitry will also affect the propagation delay through one shot 713. Thus, sampling nodes within the propagation path of one shot 713 allows slew control circuit 700 to determine the appropriate slew rate control signals.

For one embodiment, nodes "A" and "B" of the propagation path are coupled to latches 740 and 750, respectively. Accordingly, when SAMP1 is active, node "A" is captured by latch 740 and node "B" is captured by latch 750. The output of latch 740 is coupled to NAND gate 752 via line 751. The output of latch 750 is coupled to NAND gate 753 via line 761. NAND gates 752 and 753 generate src 771 and 772. Thus, the PVT conditions that control the propagation though one shot 713 are used to generate the slew rate control signals. For example, if lines 751 and 761 capture no signal transition the PVT conditions are slow and the slew rate is adjusted accordingly.

Given that slew rate control 700 does not directly measure the slew rate at the output of the interface circuitry, the slew rate control signals may not always map to each PVT conditions. By simulating or characterizing many of the possible PVT conditions, it may be determined that there are situation in which the outputs src 771 and src 772 might lead to undesirable slew rates. Accordingly, NAND gates 752 and 753 are also coupled to input load 760. For one embodiment, load 760 provides greater flexibility in overriding the PVT dependent values generated by one shot 713. Similarly, load 770 is used to generate src 773 and 774 without any PVT dependencies, thus adding greater flexibility to the slew rate control signals. For alternative embodiments, a greater number of sampling nodes are used, thus resulting in a larger number of slew rate control signals and finer control over the slew rate.

Figure 8:
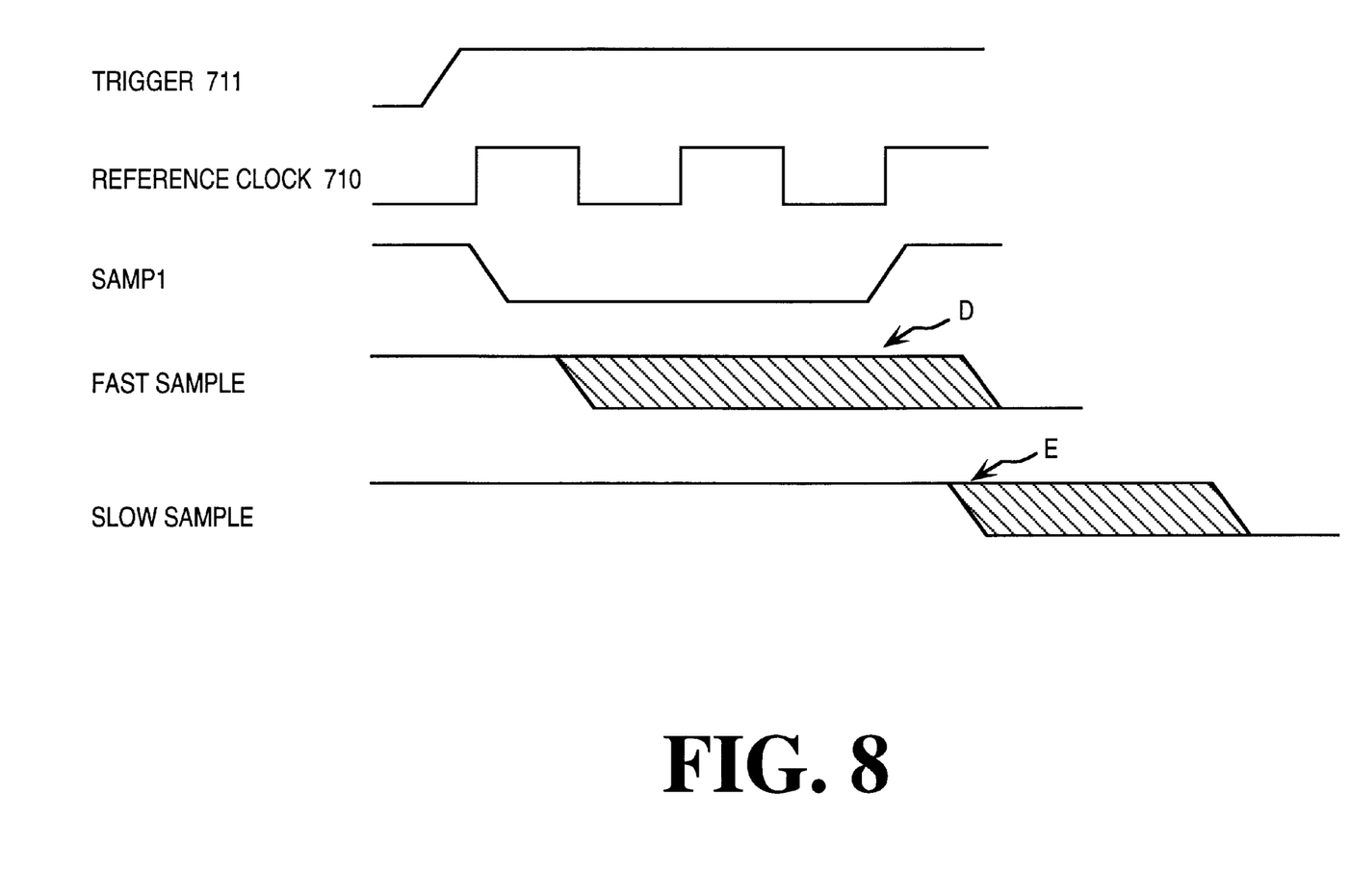
FIG. 8 is the timing diagram that illustrates the relation between slew rates and a sampling clock signal.

FIG. 8 illustrate the timing relation between slew rates and the sampling clock, SAMP1. Waveform "D" indicates a fast propagation delay though one shot 713, indicative of fast operating conditions and a fast slew rate. Waveform "E" indicates a slow propagation though one shot 713, indicative of slow operating conditions and a slow slew rate. Waveforms "D" and "E" indicate possible data transition at node X of FIG. 7 relative to the sampling signal SAMP1. Waveform "D" corresponds to fast operating conditions where both nodes "A" and node "B" have been discharged by trigger 711 prior to SAMP1. In waveform "E", however, the data transition has not reached node "A" nor node "B" prior to SAMP1. Waveform "E" corresponds to slow operating conditions.

Accordingly, for the present embodiment, if latch 740 captures a data transition and latch 750 does not capture a data transition, the propagation delay is nominal. If neither latch 740 nor latch 750 capture a data transition the propagation delay is slow and if both latches capture the data transition the propagation delay is fast. As previously discussed, the captured data transition determines the slew rate controls signals.

Figure 9:
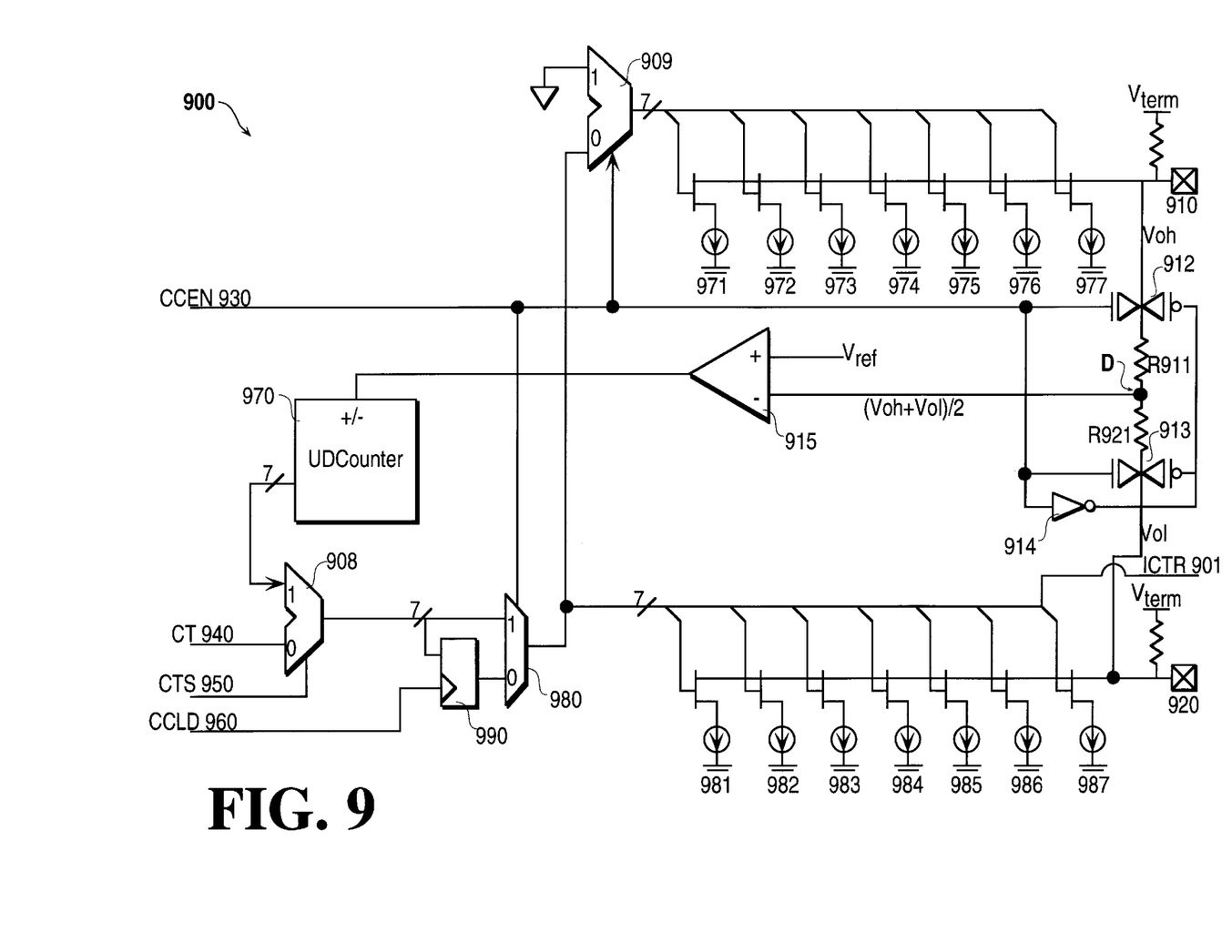
FIG. 9 shows one embodiment of a current control circuit.

FIG. 9 shows one embodiment of a current control circuit. In particular, current control 900 includes counter 970, comparator 915, muxes (908, 909, and 980), latch 990, pass gates (912 and 913), resistors (R911 and R921), and current sources (971–977 and 981–987). Current control 900 also includes output ictr 901. For one embodiment, ictr 901 is used to generate the current control signals used by the bus driver circuitry included in I/O 600, thus generating high speed outputs despite varying PVT conditions.

As shown in FIG. 9, current control 900 is coupled to pad 910 and pad 920. Using R911 and R921 as voltage dividers for the pad voltages, current control 900 creates a feedback loop that increases/decreases the pad voltages until the common node of the voltage divider, node "D", equals Vref. In particular, both Vref and the common node of the voltage divider are inputs to comparator 915. Accordingly, the output of the comparator is used to increment/decrement counter 970. Counter 970 in turn increases/decreases the voltage on the pads via the current sources. This in turn changes the voltage on node "D" until the voltage of node "D" approximately equals Vref.

For one embodiment, the resistors R911 and R921 are equal in value and pad 910 outputs a high voltage value ("voh") while pad 920 outputs a low voltage value ("vol"). Accordingly, the feedback loop in current control 900 will turn on the appropriate number of current sources (981–987) until (voh +vol)/2 approximately equals Vref. For an alternative embodiment, the current source and switch are a single transistor with a particular size. According to the present embodiment, Vref is set to 1.4 v, voh equals 1 v, and vol equals 1.8 v.

For example, for one embodiment, seven current sources are available to control the voltage of pad 920. Accordingly, counter 970 outputs a seven bit value, each bit controlling a current source. The counter output is passed from mux 908 to mux 980 and a single bit is coupled to the gate of a single current source. Muxes 908 and 980 provide testing/bypass features described below. Accordingly, when comparator 915 detects that the voltage on node "D" is greater than Vref, the comparator causes counter 970 to increment a value from the present counter value. For example, assuming the counter value is "0000111" the increment would result in a counter value of "0001000," thus turning on one or more current source. The inverse process occurs when Vref is greater than the voltage on node "D," resulting in one or more current source turning off. Once calibrated, the seven bit counter value is stored in latch 990. For one embodiment, latch 990 is used to remove the dither associated with counter 970 oscillating between a value above and below Vref. The captured value is output on ictr 901.

According to the present embodiment, current control 900 uses a digital adjustment to increase or decrease the current strength on pad 920. In an alternative embodiment, a mapping scheme is used to equate the counter output to a large number of current control signals, thus providing finer control over current control for different PVT conditions. For yet another embodiment, the mapping between the counter output and the number of current sources is on a logarithmic scale, thus provided higher precision in current control with a smaller count value.

Control 900 also includes inputs current control load (ccld 960), current control enable (ccen 930), current test (ct 940), and current test select (cts 950). Input ccld 960 is used as a clocking signal to capture data in latch 990. As previously described, latch 990 is used to hold the output ictr 901. Accordingly, for one embodiment, ccld 960 loads the counter output into latch 900 after a predetermined time. The predetermined time is selected to ensure that the feedback loop has adjusted the pad voltages so that the voltage of node "D" approximately equals Vref.

Input ccen 930 is used to enable/disable current control 900. For one embodiment, current control calibration is performed during inactive periods of the DATA BUS 250. Accordingly, when ccen 930 is low, pass gates 912 and 913 disconnect the feedback loop. Additionally, when ccen 930 is low, mux 980 selects the output of latch 990 instead of counter 970's output. These two steps ensure that current control 900 does not vary output ictr 901 while ccen is low.

By simulating or characterizing many of the possible PVT conditions, it may be determined that there are situations in which the output ictr 901 might lead to undesirable drive strengths. Accordingly, inputs ct 940 and cts 950 provide greater flexibility to current control 900 by allowing the current control 900 to bypass the feedback loop and input predetermined values. In particular, when cts 950 is inactive, mux 908 selects the value on input ct 940 instead of the counter 970's output. Accordingly, the value on ct 940 is either stored in latch 990 or used to enable the current sources for testing. In one embodiment, ct 940 and cts 950 are used to input a current control value approximating a desired value, thus allowing the feedback loop to reach the desired value more efficiently.

According to the present embodiment, R911 equals R921, thus providing a voh and vol that fall symmetrically around Vref. For alternative embodiments, R911 and R913 are varied so that voh and vol do not fall symmetrically around Vref.

Figure 10:
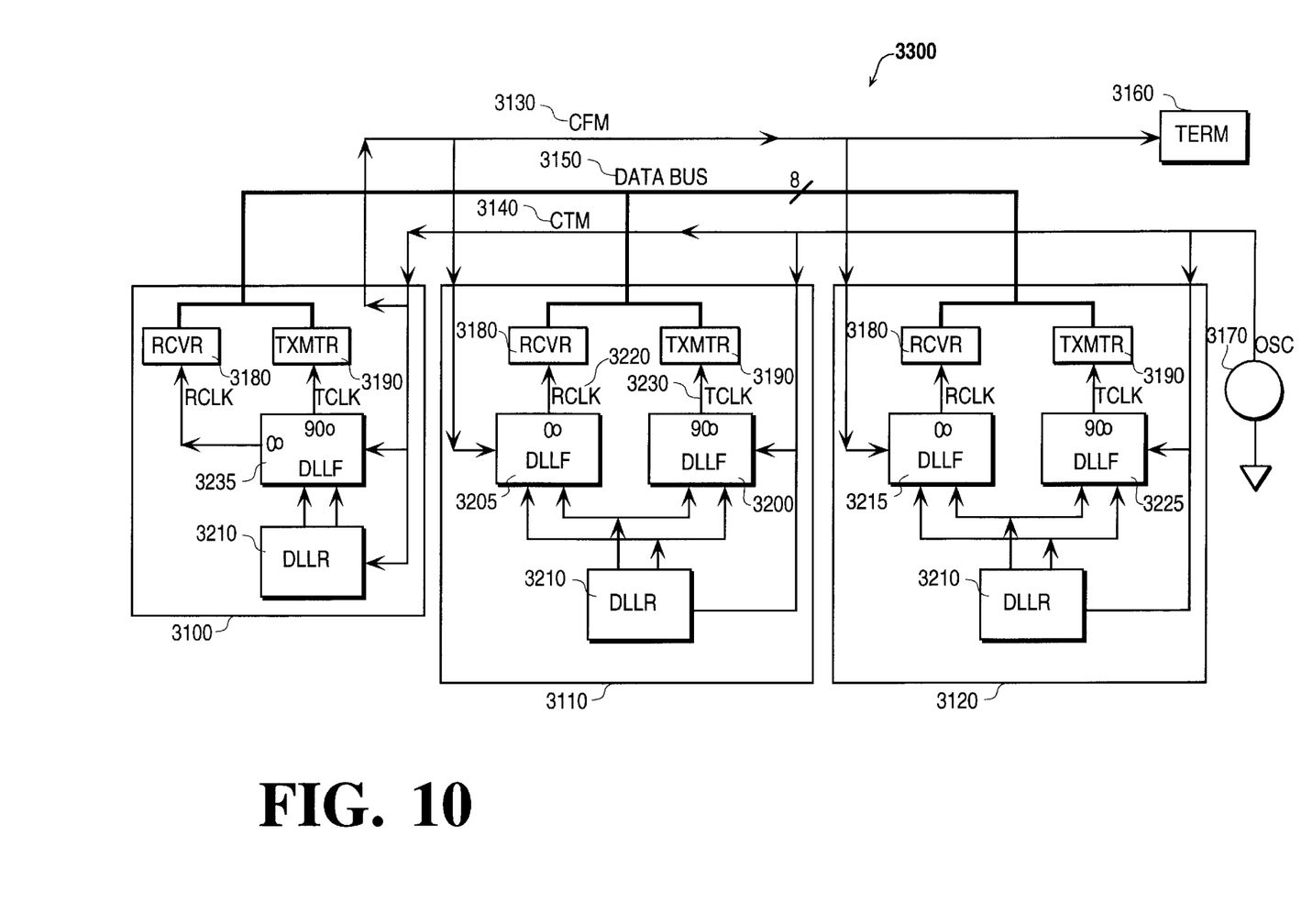
FIG. 10 show one embodiment of delay locked loops used in multiple devices.

FIG. 10 show one embodiment of a system using delay locked loops. In particular system 3300, shows the use of a DLL in devices 3100, 3110, and 3120. Devices 3100, 3110, and 3120 are coupled via signal lines data bus 3150, CFM 3130, and CTM 3140. For one embodiment, the data transmission rate along data bus 3150 is 800 Mb/s per signal line.

Accordingly, using the DLLs, CFM 3130, and CTM 3140, system 3300 ensures a synchronous data transmission along data bus 3150 between device 3100 and device 3110. System 3300 also ensures a synchronous data transmission along data bus 3150 between device 3100 and device 3120.

For one embodiment, CTM 3140 and CFM 3130 are generated from oscillator 3170. Additionally, device 3100 is a master device and devices 3110 and 3120 are slave devices. CTM travels in the direction from the slave device to the master device and is used for data transmitted to the master device on data bus 3150. In the master device, CTM 3140 is looped back to generate CFM 3130, which travels in the direction from the master to the slave. Each device, has a data receiver, rcvr 3180, and a data transmitter, txmtr 3190, for receiving and sending data respectively. The rcvr 310 uses a signal RCLK 3220 to receive data from data bus 3150. Txmtr 3190 uses TCLK 3230 to transmit data onto data bus 3150. Signals RCLK 3220 and TCLK 3230 are generated from a pair of DLLs 3200 and 3205 in the slave device and from a single DLL 3235 in the master device. The master device uses only one DLL because the master device makes no distinction between CTM 3140 and CFM 3130.

In FIG. 10, DLLR 3210 is the called the reference loop. Each device uses a single reference loop. DLLF 3200 is the delay locked loop for generating a predetermined phase relationship between RCLK 3220 and TCLK 3230. In particular, DLLF 3200 and DLLF 3225 are used to generate a 90 degree phase relationship between CTM 3140 and TCLK 3230. Accordingly, data is always transmitted in quadrature to the receive clock, RCLK 3220. Thus, when a slave device transmits data to the master device, the data transition occurs 90 degrees out of phase with CTM 3140, the clock traveling to the master device. The master receives CTM 3140 and generates the RCLK 3220 signal for operating rcvr 3180. Signal RCLK 3220 in the master is in a 0 degree phase relationship with CTM 3140. Accordingly, the master device samples data only during a non-transition point. FIG. 4 illustrates the data transition and receive clock relation in a master device according to the present embodiment.

Similarly, when the master device sends data to a slave device, DLLF 3235 is used to generate a 90 degree phase relationship between CFM 3130 and TCLK 3230. The slave devices 3110 and 3120 use DLLF 3205 and DLLF 3215, respectively, to generate a zero degree phase relationship between CFM 3130 and RCLK 3220. Thus, the slave devices sample data only during a non-transition point. FIG. 4 also illustrates the data transition and receive clock relation in a slave device according to the present embodiment. In this manner, data may be transmitted using both edges of the CTM 3140 or CFM 3130 signals and safely sampled in the receiver.

Figure 11:
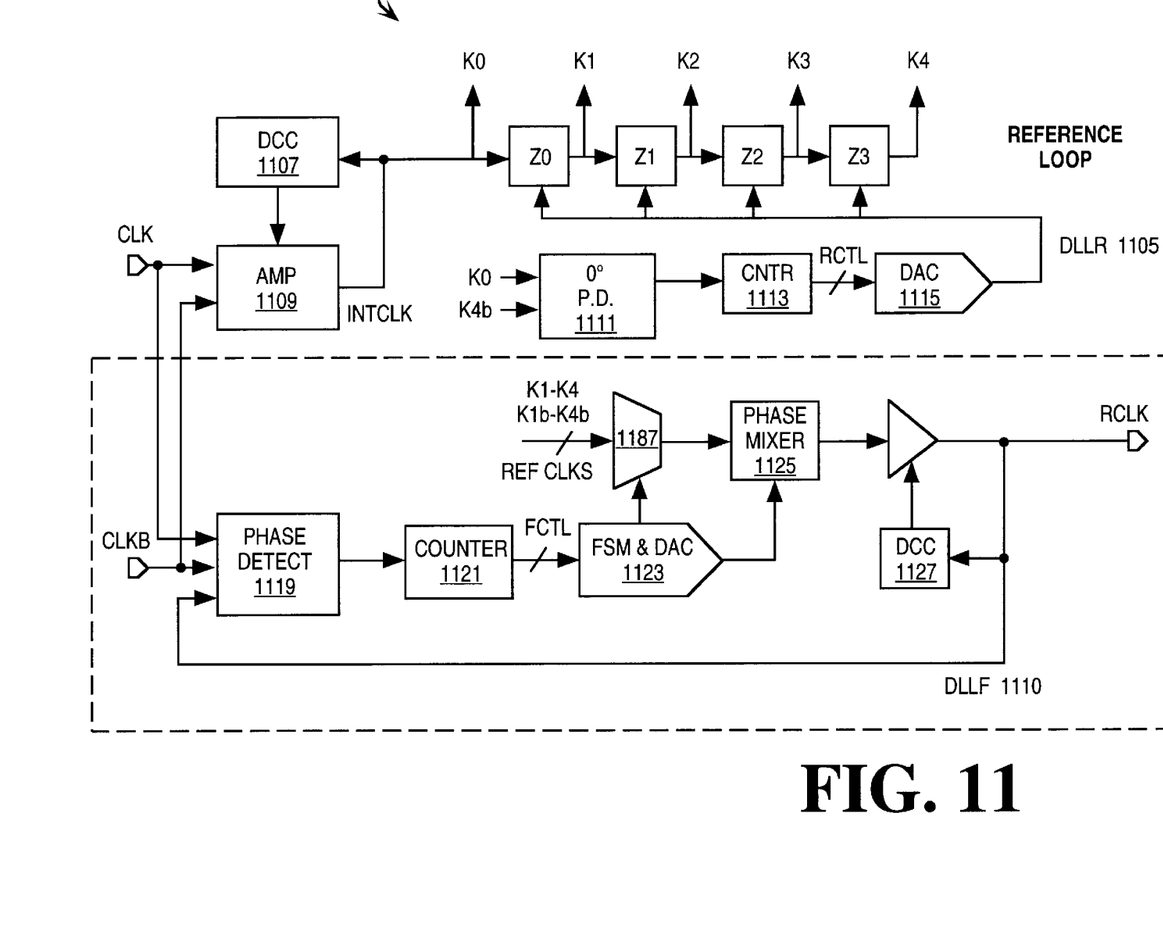
FIG. 11 show one embodiment of the delay locked loop.

FIG. 11 shows one embodiment of a DLL block. In particular, DLL 1100 includes a fine loop, DLLF 1110, and a reference loop, DLLR 1105 used in a slave device. Using inputs CLK and CLKB, the reference loop creates reference vectors, K1–K4. The fine loop uses these reference vectors to generate rclk. For one embodiment, CLK and CLKB are differential inputs.

DLLR 1105 receives input CLK and uses a duty cycle control (DCC 1107) and an amplifier (AMP 1109) to generate signal INTCLK. For one embodiment, INTCLK is a CMOS clock with a 50 percent duty cycle. Using INTCLK, DLLR 1105 generates a set of reference vectors K1–K4 and their complements that span 360 degrees. The set of reference vectors is generated via adjustable delay elements Z0–Z3. The delay used in Z0–Z3 to generate K1–K4 is determined by a feedback loop created by phase detector (PD 1111), a counter (CNTR 1113), and a digital to analog converter (DAC 1115). In particular, PD 1111 has inputs K0 and K4b, the complement of vector K4. PD 1111 detects whether there is a leading or lagging phase between K0 and K4b. The leading or lagging phase indication from PD 1111 goes to CNTR 1113, which converts the leading/lagging phase indication into a count value. DAC 1115 converts the count value into an analog signal used to increase/decrease the delay in Z0–Z3. According to the present embodiment, the delay elements have an equal value. Additionally, each delay element is varied by the same control signal, thus each reference signal is shifted a 45 degree phase from the previous vector. In an alternative embodiment, a voltage controlled oscillator phase locked loop is used to generate the reference vectors K1–K4.

The fine loop selects a pair of reference vectors and generates output rclk. In particular, DLLF 110 selects a pair of vectors to bracket the desired final clock output, via mux 1117. The inputs to mux 1117 are the reference vectors K1–K4 and their complements K1b–K4b. For one embodiment, input selection is determine by a feedback loop created by phase detector (PD 1119), a counter (CNTR 1121), and a finite state machine including a DAC (1123). PD 1119 samples RCLK and compares RCLK to input CLKB. PD 1119 indicates whether there is a leading or lagging phase between RCLK and CLKB. Similar to the reference loop, the leading or lagging phase indication from PD 1111 goes to CNTR 1121, which converts the leading/lagging phase indication into a count value. Using the count value, block 1123 selects the appropriate pair of vector reference inputs that bracket the desired RCLK phase. Phase mixer 1125 selects a precise phase adjustment within the bracketed 45 degrees of displacement and generates rclk. DCC 1127 is used to ensure a 50 percent duty cycle in the generated rclk.

FIG. 11 show one embodiment of a receive clock generated in a slave device. Generating a transmit clock, tclk, follows the same process, however, PD 1119 is a quadrature phase detector which adds a 90 degree phase shift. In an alternative embodiment, DLL 1110 is used in a master device. Accordingly, in a master device both inputs CLK and CLKB are coupled to CTM 3140.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A drive circuit, comprising:
   a plurality of selector circuits;
   a plurality of control inputs;
   a plurality of pre-driver groups having a plurality of pre-drivers, each pre-driver group coupled to a corresponding one of the plurality of selector circuits, each pre-driver group coupled to the plurality of control inputs, the control inputs to enable one or more of the plurality of pre-drivers within each pre-driver group; and
   a plurality of output drivers, each output driver having an input and an output, each input of an output driver coupled to a corresponding one of the plurality of pre-driver groups, the selector circuits to enable one or more of the plurality of output drivers, the outputs of the plurality of output drivers coupled together and having a slew rate, the slew rate determined by a first number of the plurality of pre-drivers that are enabled and by a second number of the plurality of output drivers that are enabled.

2. The drive circuit of claim 1, wherein varying the first number of pre-drivers and the second number of output drivers changes the slew rate.

3. The drive circuit of claim 2, wherein the plurality of control inputs determines the first number of pre-drivers within each pre-driver group that are coupled to the input of a corresponding one of the plurality of output drivers.

4. The drive circuit of claim 3, wherein increasing the first number of pre-drivers coupled to the input of a corresponding one of the plurality of output drives increases the slew rate.

5. The drive circuit of claim 1, wherein the plurality of selector circuits have data inputs and a clock input, the clock input to select from among the data inputs, the data inputs to enable one or more of the plurality of output drivers.

6. The drive circuit of claim 5, wherein the data inputs adjust the slew rate.

7. The drive circuit of claim 6, wherein the plurality of selector circuits comprise NAND gates coupled to multiplexers.

8. The drive circuit of claim 6, wherein the plurality of output drivers are NMOS transistors.

9. An interface circuit, comprising;
   a plurality of drive circuits, each of the plurality of drive circuits having a first input, a second input, and an output;
   a first control circuit coupled between the first input and the output of at least one of the plurality of drive circuits, the first control circuit to control a current flow on the output of the at least one of the plurality of drive circuits, the current flow based on an output voltage on the output of the at least one of the plurality of drive circuits; and
   a second control circuit coupled to the second input of the at least one of the plurality of drive circuits, the second control circuit to control a slew rate on the output of the at least one of the plurality of drive circuits.

10. The interface circuit of claim 9, wherein the first control circuit comprises:
    a voltage divider coupled to the output of the drive circuit to generate an internal voltage;
    a comparator coupled to the voltage divider, the comparator to compare the internal voltage with a reference voltage, the comparator to generate a transition voltage; and
    a counter coupled to receive the transition voltage from the comparator, the counter to incrementally adjust the current flow on the output of the drive circuit.

11. The interface circuit of claim 10, wherein the current flow is incrementally adjusted by selectively coupling a plurality of current sources to the output.

12. The interface circuit of claim 9, wherein the second control circuit comprises:
    a logic circuit having a clock input and a trigger input, the logic circuit to generate a pulse signal having a pulse width based on the trigger input;
    a one-shot circuit coupled to receive the pulse signal, the one-shot circuit to generate a plurality of control inputs, the control inputs to control the slew rate on the output of the at least one of the plurality of drive circuits.

13. The interface circuit of claim 12, wherein the trigger input is coupled to receive a calibration signal to initiate generation of the pulse signal propagated through the one-shot circuit.

14. The interface circuit of claim 9, wherein each of the plurality of drive circuits have a first and a second clock inputs and wherein the interface circuit further comprises:

a clock circuit coupled to the first and the second clock inputs, the clock circuit to synchronize two timing signals, the clock circuit to transmit the synchronized two timing signals to the first and the second clock inputs.

15. The interface circuit of claim 14, wherein the synchronized two timing signals have a predetermined relationship.

16. The interface circuit of claim 15, wherein the predetermined relationship is a 90 degree phase relationship.

17. The interface circuit of claim 16, wherein the clock circuit is a delay locked loop.

18. A data transfer system, comprising:

a bus having data lines, a first clock, and a second clock;

a first device and a second device coupled to the bus, each device having an interface circuit, the interface circuit further comprising:

a plurality of drive circuits, each of the plurality of drive circuits having a first input, a second input, a first clock input, a second clock input, and an output;

a clock circuit coupled to the first and the second clock inputs, the clock circuit to synchronize the first clock and the second clock, the clock circuit to transmit the synchronized first and second clocks to the first and the second clock inputs;

a first control circuit coupled between the first input and the output of at least one of the plurality of drive circuits, the first control circuit to control a current flow on the output of the at least one of the plurality of drive circuits; and a second control circuit coupled to the second input of the at least one of the plurality of drive circuits, the second control circuit to control a slew rate on the output of the at least one of the plurality of drive circuits.

19. The data transfer system of claim 18, wherein the clock circuit operates to time data on the output of the plurality of driver circuits a phase prior to the first clock.

20. The data transfer system of claim 19, wherein the first device and the second device are memory devices.

21. A method of adjusting slew rate on an output of a drive circuit, comprising;

generating a plurality of drive control signals based on a calibration signal;

generating a current control signal based on a voltage of the output of the drive circuit; and enabling a plurality of pre-drivers using the plurality of drive control signals, the plurality of pre-drivers coupled to a corresponding plurality of output drivers, the plurality of pre-drivers enabled to adjust the slew rate on the output of the drive circuit.

22. The method of claim 21, further comprising enabling at least one of a plurality of output drivers using on the current control signal.

23. The method of claim 22, further comprising generating a feedback loop to use the voltage of the output of the drive circuit to determine a drive current for the output.

24. The method of claim 21, further comprising timing a data output of the drive circuit to operate a phase prior to a first clock signal, the timing based on a synchronization of the first clock signal and a second clock signal.

* * * * *